United States Patent
Maruyama et al.

(10) Patent No.: US 12,143,357 B2
(45) Date of Patent: Nov. 12, 2024

(54) COMMUNICATION CONTROL APPARATUS AND SYSTEM

(71) Applicant: Hitachi, Ltd., Tokyo (JP)

(72) Inventors: Tatsuya Maruyama, Tokyo (JP); Noritaka Matsumoto, Tokyo (JP); Hiroshi Iwasawa, Tokyo (JP); Hiromichi Endoh, Tokyo (JP); Junya Fujita, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 17/639,860

(22) PCT Filed: Jun. 23, 2020

(86) PCT No.: PCT/JP2020/024603
§ 371 (c)(1),
(2) Date: Mar. 2, 2022

(87) PCT Pub. No.: WO2021/059632
PCT Pub. Date: Apr. 1, 2021

(65) Prior Publication Data
US 2022/0329564 A1    Oct. 13, 2022

(30) Foreign Application Priority Data
Sep. 24, 2019   (JP) ................. 2019-172583

(51) Int. Cl.
H04L 29/06    (2006.01)
H04L 9/40    (2022.01)

(52) U.S. Cl.
CPC ............... H04L 63/0209 (2013.01)

(58) Field of Classification Search
CPC . H04L 43/04; H04L 63/1425; H04L 63/1416; H04L 63/0209; H04L 63/0428; H04L 63/1433; H04L 63/1441
See application file for complete search history.

(56) References Cited

U.S. PATENT DOCUMENTS

| 2016/0261482 A1 | 9/2016 | Mixer et al. |
| 2017/0163658 A1* | 6/2017 | Pike ................... H04L 63/1408 |
| 2020/0120070 A1* | 4/2020 | Thubert ................. H04L 67/60 |

FOREIGN PATENT DOCUMENTS

| JP | 2006-148505 A | 6/2006 |
| JP | 2015-119386 A | 6/2015 |

(Continued)

OTHER PUBLICATIONS

Office Action issued in corresponding Chinese Patent Application No. 202080062397.0, with English Machine Translation dated Jun. 29, 2023 (20 pages).

(Continued)

*Primary Examiner* — Dao Q Ho
(74) *Attorney, Agent, or Firm* — Foley & Lardner LLP

(57) ABSTRACT

Conventional security measures are generally intended for an IT system, and it has been difficult to satisfy a real-time property and availability requested to a control system. Furthermore, since a time-division type time slot communication method is not taken into consideration, such time slot communication has problems in efficient utilization of computer resources and decrease in availability. In order to solve the above-described problems, the present invention specifies a time slot from characteristics of a communication packet received by a reception unit 133 by using a time slot characteristic storage unit 130, and selects, in accordance with the specified time slot, an inspection pattern stored in an inspection pattern storage unit 136 by using an inspection pattern selection unit 131.

5 Claims, 14 Drawing Sheets

(56) References Cited

FOREIGN PATENT DOCUMENTS

| JP | 2016-163352 A | 9/2016 |
| JP | 2019-004249 A | 1/2019 |

OTHER PUBLICATIONS

Zte et al., "Considerations on DL reference signals and channels design for NR-U", 3GPP TSG RAN WG1 Meeting #96bis R1-1903871, Apr. 8-12, 2019, Xi'an, China (6 pages).

* cited by examiner

| No. | INSPECTION PATTERN NAME | INTENDED USE | COMMUNICATION PROTOCOL | APPLICATION PROGRAM |
|---|---|---|---|---|
| 1 | - | | ETHERCAT COE | PROGRAM B |
| 2 | - | CONTROL | | |
| 3 | - | | | PROGRAM A |
| 4 | - | | IEC 61850 GOOSE | PROGRAM C |
| 5 | - | TIME SYNCHRONIZATION | IEEE 1588 | |
| 6 | - | | | PROGRAM D |
| 7 | - | | | PROGRAM E |
| | ... | | | |

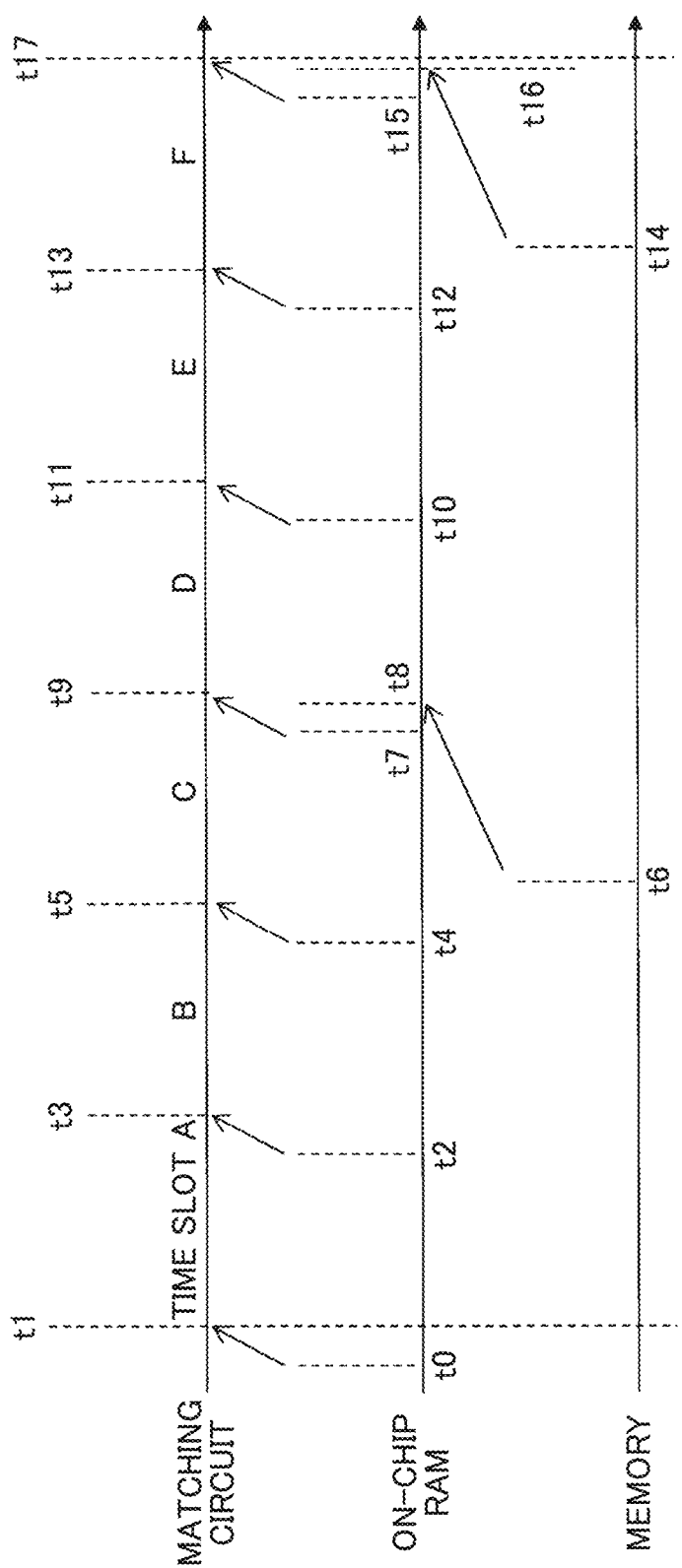

FIG. 15
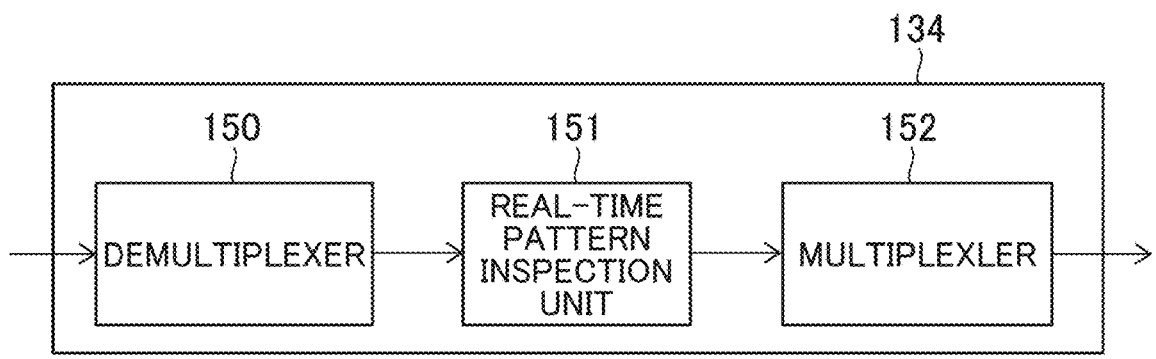
FIG. 16
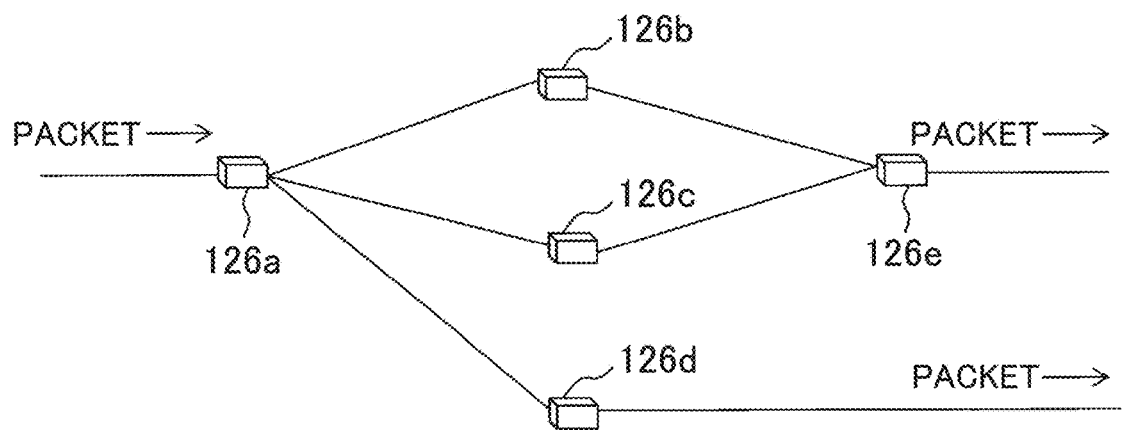
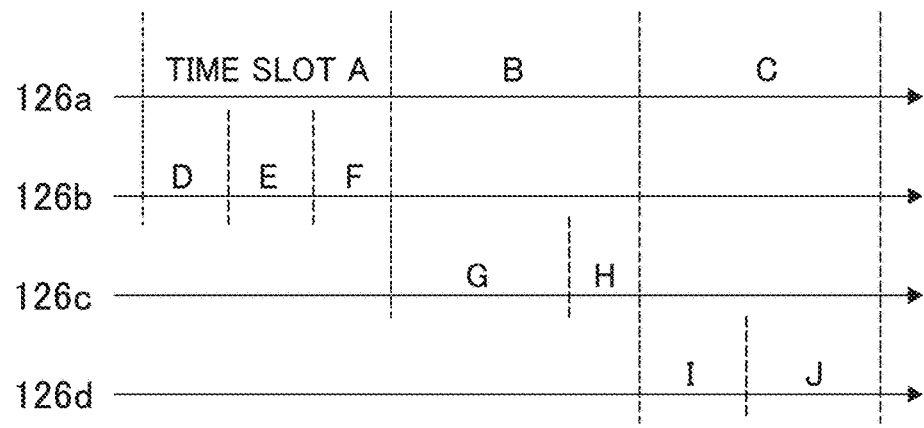

COMMUNICATION CONTROL APPARATUS AND SYSTEM

TECHNICAL FIELD

The present invention relates to a communication control technology, and also to an information processing apparatus, an information processing hardware, an information processing software, a communication control method, and a communication system for the same.

BACKGROUND ART

There is a configuration, as a control system, in which a controller controls one or more controlled objects via a network. In such a control system, an appropriate control network is selected and applied in accordance with the intended use, requirement, or request of the control system. From a technical point of view, it can be said that increasing requirements for the control systems brought a technical advancement of the control network. There is a variety of such requirements for the control system, including reduction of communication delay, cost reduction, increase in the number of terminals connected, high accuracy of time synchronization, increase of communication distance, standardization of communication medium and communication data models, redundant communication, and the like.

Along with technical development owing to introduction of the standardization technology, requirement for the control system in the control network is advancing. Conventionally, improvement of control communication performance with a controlled object has been pursued. In recent years, however, the intended use includes not only the communication performance but also application of an AI to a control system and assets management by application of CBM (Condition Based Maintenance) with the use of maintenance data, for example.

One example of such a control network that accelerates introduction of information technology to the control system may be a TSN (Time Sensitive Networking).

A communication scheme constituted by a series of the IEEE standards called TSN is a control network in which the IEEE 802.3 standard is applicable to the control system. The TSN can be used appropriately for control communication and information communication (including communication for the AI, intended use for monitoring, the CBM, and the like) with respect to each time slot by introducing a time slot communication/time division multiple access.

That is, it is possible to establish information communication while satisfying a real-time requirement for control communication on the same network.

On the other hand, in association with introduction of the standardization technology and the IT technology, threat to cyber security is increasing in control systems. Especially ensuring security in the field must satisfy such requirements specific to the control system as real-time property and availability, which is difficult to cope with.

CITATION LIST

Patent Literature

Patent Literature 1: Japanese Unexamined Patent Application Publication No. 2006-148505
Patent Literature 2: Japanese Unexamined Patent Application Publication No. 2015-119386

SUMMARY OF INVENTION

Technical Problem

However, it has been difficult to satisfy the real-time property and the availability required by the control system as described above because the prior-art security measures were generally directed to an IT system.

Patent Literature 1 discloses an invention of storing a communication data packet in a relay. However, relaying a packet requires at least two operations of writing to and reading from a memory, which can be a cause of increasing delay due to the relaying. Although it may be possible to reduce the delay by increasing a processing speed of a memory device and a bus, this may increase the size of the relay and power consumption. Such an increase of the processing speed is not preferable when considering that an installation site for a control apparatus is limited in many of the facilities to be controlled and that heat output is managed to secure reliability of the control apparatus.

Furthermore, Patent Literature 2 discloses a technology of receiving a plurality of elements in a communication frame transmitted from a first communication device in the order, determining a feature value indicative of a feature of the communication frame, and determining whether the feature value satisfies a condition. The invention further includes transferring the plurality of received elements in the order, changing some of the plurality of transferred elements if it is determined that the feature value does not satisfy the condition, and transmitting the elements to a second communication device in the order. However, because a time division type of the time slot communication scheme such as the TSN is not taken into account, there are issues of efficient use of computer resources and reduction of availability by an across-the-board comparison of feature values in such a time slot communication scheme.

Solution to Problem

In order to address the above-described issues, the present invention determines security measures in accordance with each time slot. Determination of the security measures includes determination of inspection patterns (changing the inspection patterns with respect to each time slot) and determination of a security software.

An aspect of the present invention includes the following configuration. A communication control apparatus that transfers a communication frame includes: a section that receives the communication frame; a section that identifies time for processing the communication frame; and a section that identifies security measures for the communication frame in accordance with the time slot corresponding to the specified time.

Advantageous Effects of Invention

It is made possible to take security measures in accordance with the situation in a network that employs the time slot communication.

BRIEF DESCRIPTION OF DRAWINGS

FIG. 12A shows the time slot and an operation according to an embodiment of the present invention;

FIG. 15 is a functional configuration diagram showing an embodiment of the present invention;

FIG. 16 shows a system configuration diagram and a diagram showing the time slot and the operation using an embodiment of the present invention.

DETAILED DESCRIPTION

Example of System Configuration

Figure 1:
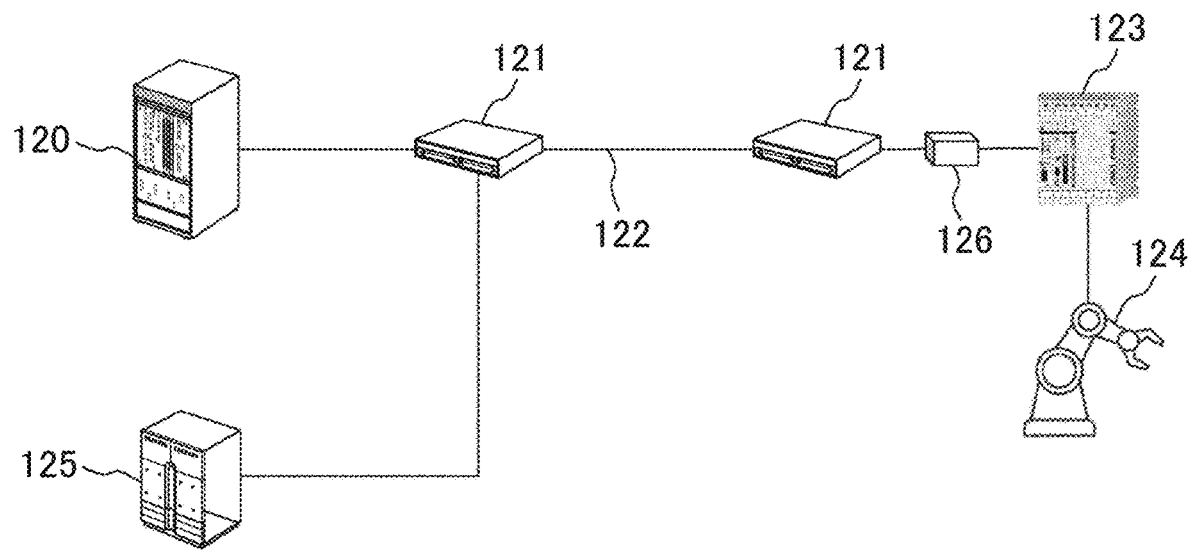
FIG. 1 is a system configuration diagram using an embodiment of the present invention.

FIG. 1 shows a system configuration to which an embodiment of the present invention is applied. A central control apparatus 120 is connected to and communicates to a distributed control apparatus 123 via a control network 122 and a network relay 121.

The central control apparatus 120 performs transmission of a control order value for controlling a controlled device 124, acquisition of a measured value, and various settings for the controlled device 124 by transmitting and receiving a communication packet to and from the distributed control apparatus 123.

The central control apparatus 120 is illustrated to communicate sampling data, control command, and status signal like a central control apparatus in a DCS (Distributed Control System) and a protection relay in a power system. The central control apparatus 120 may store the data in the same control system into a packet.

Examples of the central control apparatus 120 include a dedicated controller, an industrial personal computer, a controller, a DCS controller, a SCADA (Supervisory Control and Data Acquisition) server, a PLC (Programmable Logic Controller), an IED (Intelligent Electronic Device), a protection relay, a cloud, and a server.

The network relay 121 is a relay in the control network 122, which controls a path of a packet communicated by the central control apparatus 120, distributed control apparatus 123, or the network relay 121, and transfers the packet. Examples of the network relay 121 include various network relays such as a network switch including an L2 switch and an L3 switch, abridge, a router, a TC (Transparent Clock) and a BC (Boundary Clock) of the IEEE 1588, an OpenFlow switch, a RedBox and a QuadBox defined by the IEC 62439-3, an optical switch, an optical multiplexer, an optical demultiplexer, and the like.

The control network 122 is a network that connects the central control apparatus 120, the distributed control apparatus 123, and the network relay 121, examples of which include a network using the IEEE standards associated with the TSN, some standards that employs the time slot communication based on the IEC 61784, and other time slot communications.

Moreover, examples of a higher protocol in a protocol stack include the IEC61850, the OPC UA (Unified Architecture), the IEC61850-7-420, the IEC 60870-5-104, the OpenADR, ECHONET Lite (registered trademark), and the like. Alternatively, the above-described protocols may be hierarchized. For example, the OPC UA standard may be applied to contents in a data area on the TSN.

The distributed control apparatus 123 is connected to the controlled device 124, and controls and sets the controlled device 124 via the control network 122 in accordance with the control order received from the central control apparatus 120. Moreover, the distributed control apparatus 123 acquires the status and information about the controlled device 124 and transmits the status and information to the central control apparatus 120 via the control network 122.

Examples of the distributed control apparatus 123 include a dedicated controller, an industrial personal computer, a controller, a DCS controller, a SCADA device, a PLC, an IED, an MU (Merging Unit), and a protection relay.

The controlled device 124 is an equipment or a device controlled by the distributed control apparatus 123. Examples of the controlled device 124 include an industrial robot such as a mobile robot and a robot arm, a chip mounter, a machine tool table, a machining device, a machine tool, a semiconductor manufacturing apparatus, or a motor, inverter, and a power equipment such as a circuit breaker, or a disconnecting switch in the manufacturing apparatus.

An inspection pattern management apparatus 125 manages inspection patterns in a firewall 126. The management includes such processing as update, replacement, removal, enabling, disabling, acquisition, and the like of the inspection patterns.

It should be noted that the inspection pattern indicates communication contents that characterizes an unauthorized communication. The content is defined as an invalid value or an abnormal value in an area (e.g., a destination address or a communication port number) with a meaning on a communication protocol, a specific data sequence at an arbitrary point of communication that includes a malware, or a feature value of the malware. Furthermore, the inspection pattern is one aspect of the security measure, which includes an anti-virus software to be described later.

Examples of the inspection pattern management apparatus 125 include a communication control apparatus such as an OpenFlow controller in an SDN Software Defined Network) and a dedicated communication device.

The firewall 126 is a communication device that performs processing of the present embodiment. As a basic function, the firewall 126 is installed on a communication path between respective ones of the central control apparatus 120, the network relay 121, the distributed control apparatus 123, and the inspection pattern management apparatus 125 to relay communication, and takes the security measures against unauthorized communication contents. FIG. 1 shows a configuration in which the firewall 126 is installed on a communication path between the network relay 121 and the distributed control apparatus 123.

The firewall 126 compares an input packet with the inspection patterns, and determines that the packet is an unauthorized packet or an attack packet if they match. In a case it is determined to be an unauthorized packet or an attack packet, the packet may be destroyed, or a CRC (Cyclic Redundancy Check) at the end of the packet, i.e., an error checking code at the end of the packet may be changed so that the packet can be destroyed at the destination.

Although two network relays 121 are connected between the central control apparatus 120 and the distributed control apparatus 123 in FIG. 1, there may be more or less network relays 121 and there may be a plurality of communication paths.

Examples of the system configuration shown in FIG. 1 include a control system such as a DCS for FA (Factory Automation) and PA (Process Automation), a monitoring control/protection control system in the electric power field, an industrial equipment, a semiconductor manufacturing apparatus, an in-vehicle system, a control system in a construction machinery and a railway in-vehicle, a railway signaling system, an aviation control system, and the like. An alternative example may be an IoT system that analyzes information collected via the control network 122 using the central control apparatus 120 or an artificial intelligence on a cloud or a computer not shown in the figures to improve performance of the control system.

(Hardware Configuration)

Figure 2:
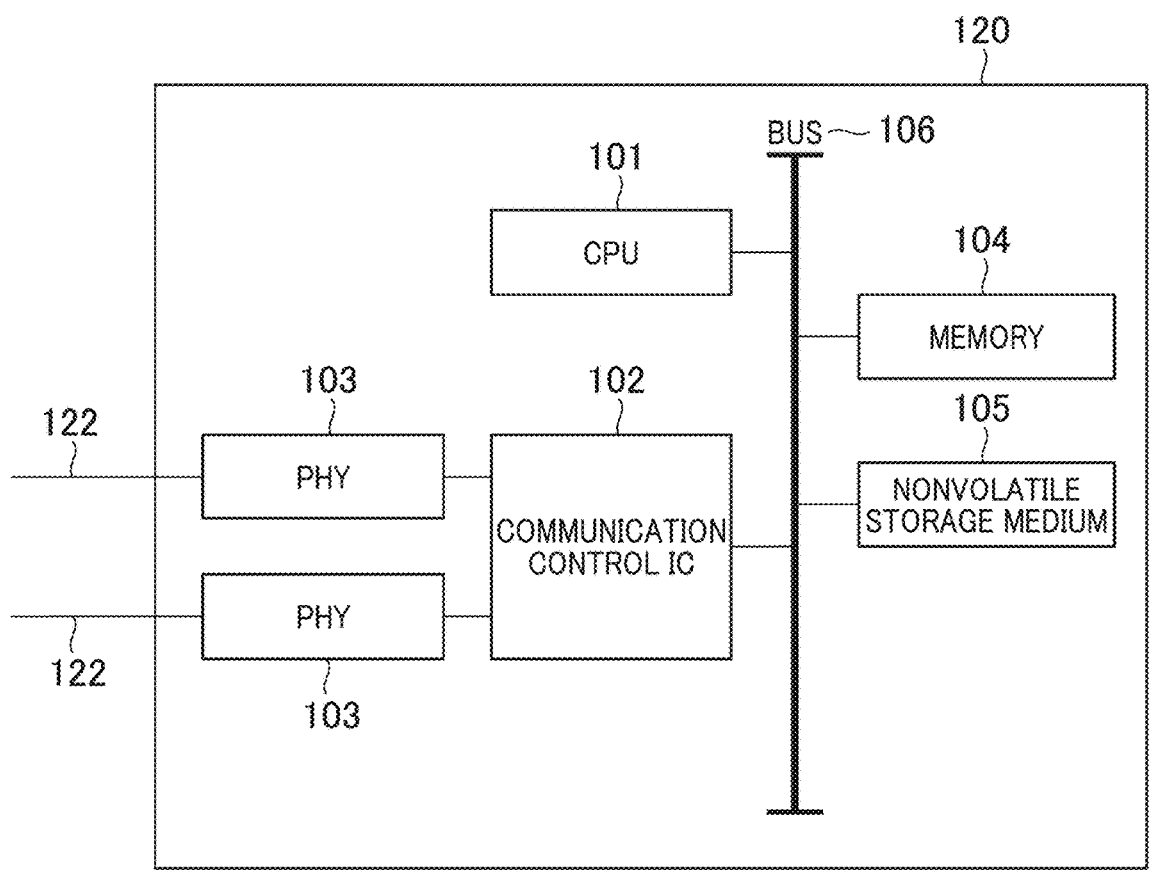
FIG. 2 is a hardware configuration diagram in an embodiment of the present invention.

FIG. 2 shows a hardware configuration of the firewall 126 to which the present embodiment is applied.

A CPU 101 transfers a program from a nonvolatile storage medium 105 to a memory 104 and executes the program. Examples of an execution processing program include an operating system (hereinbelow, referred to as an OS) and an application program that operates on the OS. The program operating on the CPU 101 configures a communication control IC 102 and acquires status information of the communication control IC 102.

The communication control IC 102 compares a packet received from a PHY 103 with one or more inspection patterns, and destroys the packet if it is determined to be an unauthorized packet. Otherwise, the communication control IC 102 transfers the packet to the CPU 101, the memory 104, and the nonvolatile storage medium 105 via a bus 106, and has a software operating on the CPU 101 perform determination and discarding of the unauthorized packet.

Example implementations of the communication control IC 102 include ICs such as an FPGA (Field Programmable Gate Array), a CPLD (Complex Programmable Logic Device), an ASIC (Application Specific Integrated Circuit), and a gate array. Alternatively, the communication control IC 102 may be integrated with the CPU 101. The communication control IC 102 may be an IEEE 802.3 communication device including a MAC layer and a PHY layer, or the communication control IC 102 may also include a PHY function. In this case, an example implementation of the communication control IC 102 include a MAC (Media Access Control) chip, a PHY (physical layer) chip, and a chip combining the MAC and the PHY where those chips are IEEE 802.3 capable. It should be noted that the communication control IC 102 may be included in the CPU 101 or a chip set that controls an information path in a computer. Although the configuration in FIG. 2 shows a single communication control IC 102, there may be more than one communication control IC 102.

The PHY 103 is a transceiver IC implementing a function of communicating with the control network 122. An example communication standard provided by the PHY 103 is the IEEE 802.3 PHY (physical layer) chip. In the configuration shown in FIG. 2, because the PHY 103 and the communication control IC 102 are connected, the processing of the IEEE 802.3 MAC (Media Access Control) layer is included in the communication control IC 102. However, the effect of the present invention is not lost even in a configuration in which the IC offering the MAC function is arranged between the communication control IC 102 and the PHY 103 or in a configuration in which a communication IC combining the IC offering the MAC function and the PHY 103 and the communication control IC 102 are connected. It should be noted that the PHY 103 may be included in the communication control IC 102. Moreover, although the configuration in FIG. 2 shows one PHY 103 for each control network 122, there may be more than one PHY 103.

The memory 104 is a temporary storage area for the CPU 101 to operate in, where one or more inspection patterns, an OS transferred from the nonvolatile storage medium 105, an application program, and the like are stored.

The nonvolatile storage medium 105 is a storage medium for information, which is used for storing an OS, applications, device drivers, programs for operating the CPU 101, and the like, and for storing one or more inspection patterns and a result of executing a program. Examples of the nonvolatile storage medium 105 include a hard disk drive (HDD), a solid-state drive (SSD), and a flash memory. As examples of an easily removable external storage medium, a floppy disk (FD), a CD, a DVD, a Blu-ray (registered trademark) disc, a USB memory, a flash memory type memory card such as a CF card can be used.

The bus 106 connects the CPU 101, the communication control IC 102, the memory 104, and the nonvolatile storage medium 105, respectively. Examples of the bus 106 include a PCI bus, an ISA bus, a PCI Express bus, a system bus, a memory bus, and the like.

Moreover, in the configuration shown in FIG. 2, a plurality of devices (e.g., the CPU 101, the memory 104, the nonvolatile storage medium 105, and the communication control IC 102) may be configured as an FPGA incorporating a processor.

(Functional Configuration of Firewall 126)

Figure 3:
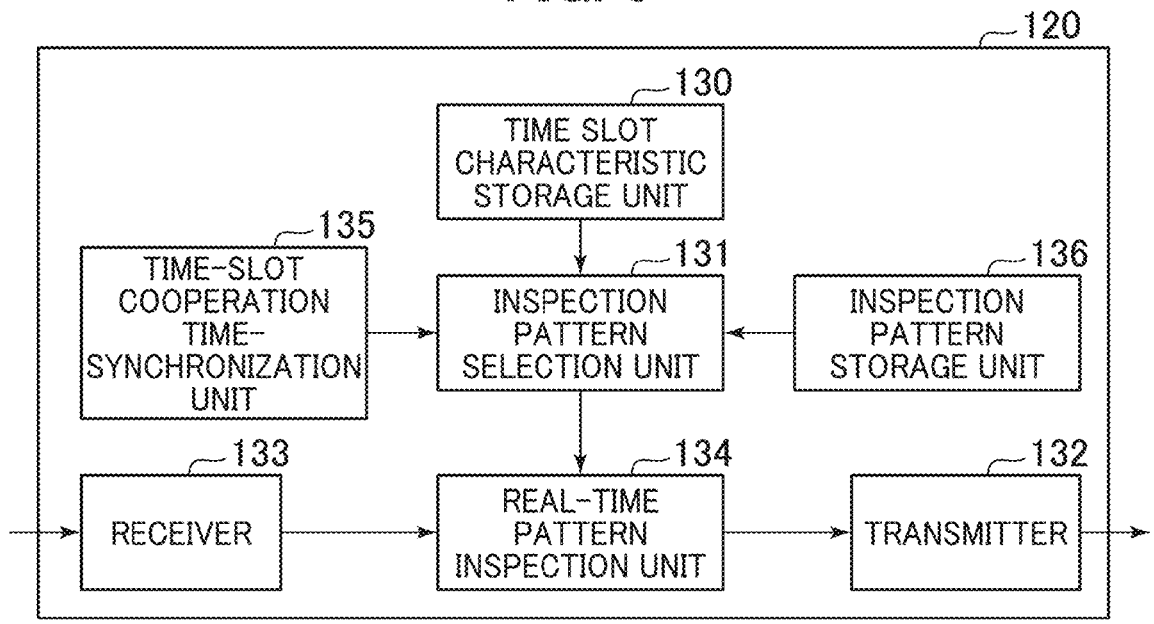
FIG. 3 is a functional configuration diagram showing an embodiment of the present invention.

FIG. 3 shows a functional configuration of the firewall 126 to which an embodiment of the present invention is applied. A time slot characteristic storage unit 130 in FIG. 3 stores therein a characteristic of each time slot set in the firewall 126. Examples of such a characteristic include an upper layer communication protocol set and/or designed to be communicated in the time slot, an intended use on an application built on the control system shown in FIG. 1, and the like. Examples of an intended use of the latter include control, information processing, management, monitoring, time synchronization, an AI (including inference), machine learning, and the like.

The time slot characteristic storage unit 130 may be constituted by either one or both of the memory 104 and the nonvolatile storage medium 105, and has a function of storing information.

An inspection pattern selection unit 131 identify the characteristic of the time slot on the basis of information from the time slot characteristic storage unit 130 in accordance with the time slot synchronized by a time-slot cooperation time-synchronization unit 135. The inspection pattern selection unit 131 also selects the inspection pattern from an inspection pattern storage unit 136. This selection result is used by a real-time pattern inspection unit 134. The inspection pattern selection unit 131 is implemented by either one or both of the communication control IC 102 and software operated on the CPU 101.

A transmitter 132 has a function of processing and transmitting data or a packet received from the real-time pattern inspection unit 134. Examples of the processing by the transmitter 132 include generating a frame from the data, duplicating the data or packet, adding a predetermined tag, calculating and adding abnormality diagnosis data such as the CRC. Examples of the tag to be added by the transmitter 132 include a VLAN tag defined by the IEEE 802.1Q, and an HSR tag and a PRP tag defined by the IEC62439-3. Setting of the VLAN tag includes setting of a PCP (Priority Code Point) and a VID (VLAN Identifier) according to definition by the standards related to the TSN.

The transmitter 132 is constituted by one or more of the PHY 103 and the software operated on the CPU 101, and the communication control IC 102. The transmitter 132 may also have the MAC function.

A receiver 133 transfers the received packet to the real-time pattern inspection unit 134. The receiver 133 may process the received packet, and examples of the processing include removal of the tag added to the packet and extraction of data. Moreover, the receiver 133 may have an information storage section for storing information about the processed packet for a predetermined time period, which may store a source address and information on the tag, for example. For example, the receiver 133 may be implemented on either one or more of the communication control IC 102, the PHY 103, and the software on the CPU 101.

The real-time pattern inspection unit 134 receives the packet or data input from the receiver 133. The real-time pattern inspection unit 134 then sequentially checks the packet or data against the inspection pattern notified from the inspection pattern selection unit 131. In order to sequentially check the input data, cut-through transfer with a constant transfer delay is possible. It should be noted that a plurality of inspection patterns may be checked in parallel. Moreover, the determination system may be a deny list system by which a packet or data that matches the inspection pattern is determined to be unauthorized, or a allow list system by which the data that matches the inspection pattern is determined to be normal (authorized).

The packet determined to be unauthorized may be discarded, or the CRC of an FCS (Frame Check Sequence) section may be intentionally set at an incorrect calculation value (a value indicative of some fraudulence) to perform the cut-through transfer. This allows the distributed control apparatus 123 on the receiving side to discard the packet.

Alternatively, the real-time pattern inspection unit 134 may determine whether the packet is authorized or not by a store and forward technique by buffering the packet in accordance with a condition, and perform a process (such as discarding the packet and changing the CRC) according to the determination result.

The real-time pattern inspection unit 134 may be constituted by either one or both of the communication control IC 102 and the software operated on the CPU 101.

The time-slot cooperation time-synchronization unit 135 manages the time slot on the firewall 126 by communicating with the network relay 121, the central control apparatus 120, the distributed control apparatus 123, and/or other firewalls 126 based on the time synchronization communication protocol and the time slot communication protocol. This allows the time-slot cooperation time-synchronization unit 135 to be time synchronized with the central control apparatus 120, the network relay 121, the distributed control apparatus 123, and/or other firewalls 126. The time-slot cooperation time-synchronization unit 135 then determines which time slot is used at a certain moment and a timing to switch to the next time slot.

In order to achieve a time synchronization protocol, the time-slot cooperation time-synchronization unit 135 supports the time synchronization protocol using the receiver 133, the transmitter 132, and the real-time pattern inspection unit 134. Examples of such a time synchronization protocol include an IEEE1588 (PTP: Precision Time Protocol), an NTP (Network Time Protocol), an SNTP (Simple Network Time Protocol) and the like.

For example, a function of a TC (Transparent Clock) is included in order to support an IEEE1588 Peer delay mechanism.

This gives an example of measuring a delay on a path by communicating synchronization packets with an adjacent device. It also gives an example of measuring residential time for the synchronization packet in the firewall 126 and adding the measured residential time to the correctionField or a time stamp on the synchronization packet (Sync or Follow Up message) by the one-step method or the two-step method.

The time-slot cooperation time-synchronization unit 135 is constituted by, for example, either one or both of the communication control IC 102 and the software operated on the CPU 101.

The inspection pattern storage unit 136 stores therein a set of inspection patterns to be checked by the real-time pattern inspection unit 134. Such an inspection pattern may be a value of a predetermined field in a predetermined communication protocol packet format or a signature (feature value) independent of a predetermined communication protocol.

Moreover, the inspection pattern may have information indicative of the deny list or the allow list. The information discriminates between the allow list and the deny list with respect to each inspection pattern, and there may be both types of the inspection patterns. It should be noted that the deny list is what makes the packet determined to be unauthorized if it matches any item in the list and to be normal if it does not match any item in the list. The allow list is what makes the packet determined to be normal if it matches any item in the list and to be unauthorized if it does not match any item in the list.

Alternatively, the inspection pattern storage unit 136 may store therein priority or a rule to determine whether the packet is unauthorized or normal in a case in which the inspection patterns in a plurality of allow lists and the inspection patterns in the deny lists match at the same time. It should be noted that "normal" can be defined as a case in which an abnormality cannot be detected.

For example, in a case in which the packet matches the inspection pattern in the deny list and the inspection pattern in the allow list at the same time, the determination result from the inspection pattern with higher priority is applied. Specifically, the packet is determined to be unauthorized when it matches an inspection pattern A in the deny list and an inspection pattern B in the allow list at the same time and the priority of the inspection pattern A is set higher.

Alternatively, assuming that there are inspection patterns A and B in the allow list and an inspection pattern C in the deny list, a rule may be expressed as "determined to be normal even if it matches C as long as it matches A and B" (A&B=>determined to be normal).

Similarly, there can be a rule "determined to be abnormal if at least one inspection pattern in the deny list is matched."

The inspection pattern storage unit 136 is constituted by, for example, any one or more of the communication control IC 102, the memory 104, the nonvolatile storage medium 105, and the software operated on the CPU 101.

(Operation Procedure of Firewall 126)

Figure 4:
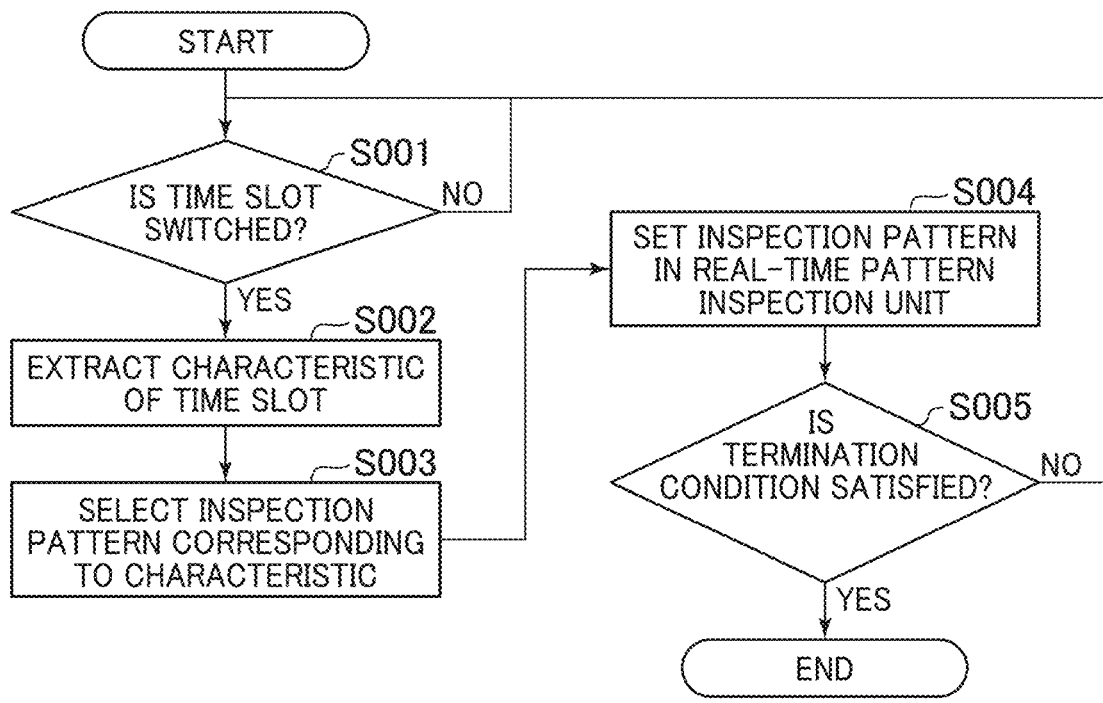
FIG. 4 shows an operation procedure of an embodiment of the present invention.

Now, FIG. 4 shows an operation procedure in setting an inspection pattern in the firewall 126. The operation procedure is focused on the inspection pattern selection unit 131.

First, on the basis of the time at which the time-slot cooperation time-synchronization unit 135 is synchronized, the process waits for switching of the time slot (S001). When the time slot is switched (Y at S001), the inspection pattern selection unit 131 extracts the characteristic of the time slot from the time slot characteristic storage unit 130 (S002). Examples of the characteristic include communication protocols to be communicated in the time slot, or such intended uses as control, information collection, monitoring, AI learning, and application programs.

Although the time slot is specified with the characteristic in the present embodiment, it may be specified using an ID for identifying a time slot in the packet. Moreover, the firewall 126 may have a table for specifying the time slot, and the time slot may be specified based on the table.

Next, the inspection pattern selection unit 131 selects an inspection pattern corresponding to the time slot extracted at S002 from the inspection pattern storage unit 136 (S003). Any number of the inspection patterns may be selected, including zero (not selected).

Next, the selected inspection pattern is set in the real-time pattern inspection unit 134 (S004).

Next, it is determined whether a termination condition is satisfied (S005). If the termination condition is satisfied (Y at S005), the process is terminated. If the termination condition is not satisfied (N at S005), the process returns to the procedure at S001 for the next time slot.

For the termination condition, the termination may be explicitly set by a system operator or a control system management apparatus (including a SCADA, a work station, and a server), or may be determined on the basis of occurrence of an abnormality such as a hardware failure and a software failure. Alternatively, the determination may be made on the basis of the fact that a predetermined number of packets or a predetermined data size is transferred, that operating time exceeds a predetermined time, or that a predetermined time period has elapsed (e.g., 10:00 to 17:00 in a day).

Although the switching of the time slot is used as a trigger at S001, the process at S001 may start at a timing earlier than the switching of the time slot by the processing time taken by any one or more of S002 to S004. In this manner, the inspection pattern can be set in the real-time pattern inspection unit 134 at the timing of switching the time slot. In order to achieve this, an example configuration performs the procedures from S002 to S004 in a fixed time period.

(Operation Procedure)

Inspection procedure of a packet in the real-time pattern inspection unit 134 is described with reference to FIGS. 5 and 6.

(Operation Procedure: Field)

Figure 5:
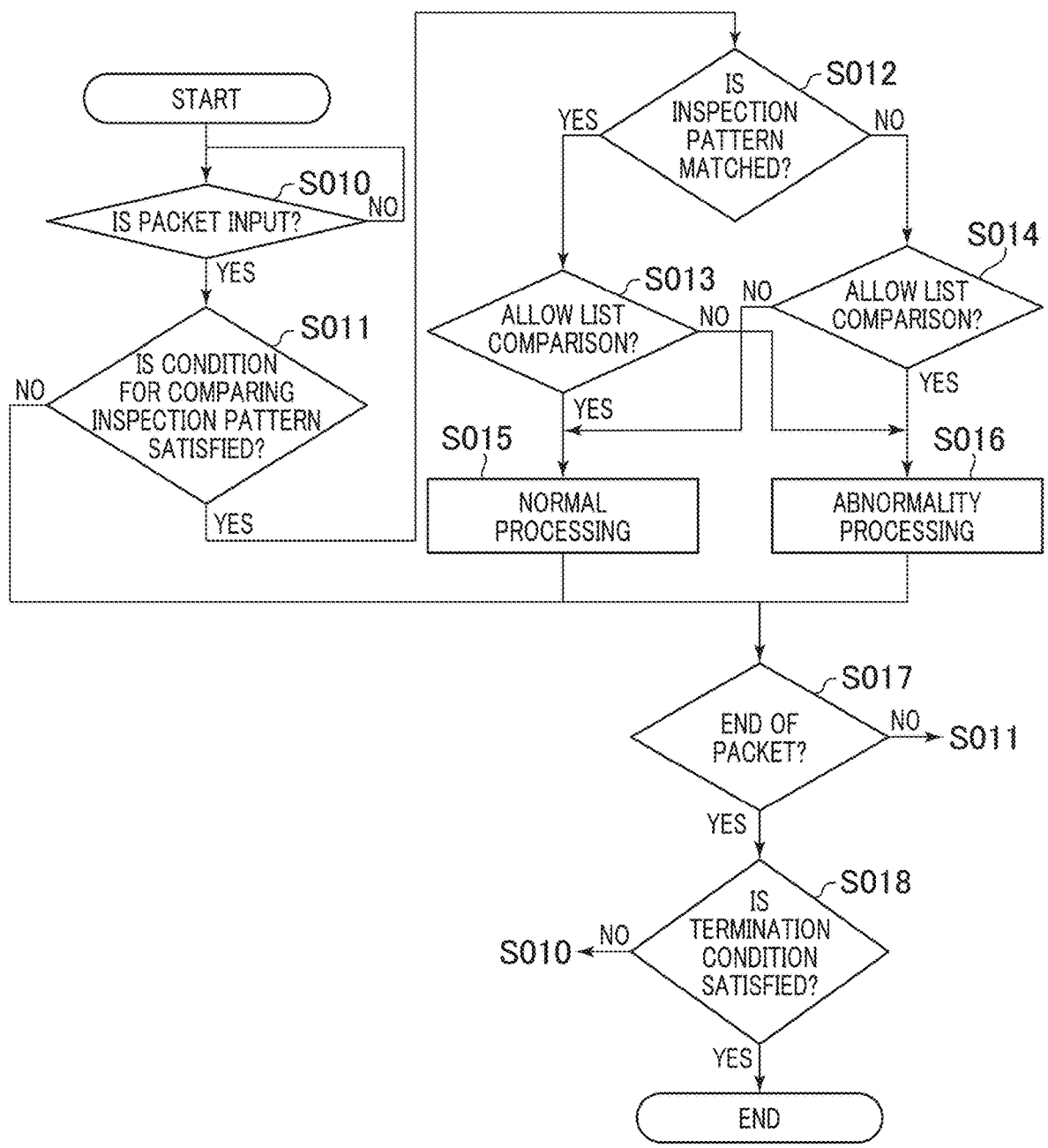
FIG. 5 shows an operation procedure of an embodiment of the present invention.

FIG. 5 shows a procedure of comparing values in predetermined fields assuming a predetermined communication protocol.

First, the receiver 133 receives a packet, and the process waits until the packet is input to the real-time pattern inspection unit 134 (S010). As an example, to enable the cut-through transfer, the receiver 133 sequentially transfers the head portion of the packet to the real-time pattern inspection unit 134 without buffering the whole packet. When the received packet is input (Y at S010), it is determined whether the condition for comparing the inspection pattern is satisfied (S011) as the input of the packet. Examples are determining the communication protocol, and specifying the position of the field with respect to each communication protocol by analyzing the contents of the packets input sequentially. For example, when targeting an IPv4 source MAC address as the inspection pattern, it is identified whether the type (the 13th byte and the 14th byte from the head) of the data input as an IEEE 802.3 frame is 0x0800 or not. Information from the 13th byte to the 16th byte of the subsequent IPv4 header is then extracted.

If the condition is satisfied at S011 (Y at S011), it is determined whether the inspection pattern is matched (S012). In both cases of matching (Y at S012) and unmatching (N at S012), it is determined whether the inspection pattern is the allow list comparison or not.

If the inspection pattern is matched (Y at S012) and the allow list comparison is performed (Y at S013), and if the inspection pattern is not matched (N at S012) and the allow list comparison is not performed (N at S014), the packet is processed as normal (S015).

On the other hand, if the inspection pattern is matched (Y at S012) and the allow list comparison is not performed (N at S013), and if the inspection pattern is not matched (N at S012) and the allow list comparison is performed (Y at S014), processing for abnormality is performed on the packet as an unauthorized packet (S016).

An example of the normal processing includes transferring the received packet as it is without performing any process on it. Furthermore, in a case of an IEEE 1588 time synchronization packet, for example, the residential time in the firewall 126 is added to a correctionField (a field on an IEEE 1588 header used for residential time and delay correction). Although there is an expression "Allow list comparison?" at S013 and S014 in the present embodiment, it can be expressed as "Deny list comparison?". That is, it is determined whether the allow list comparison is used or the deny list comparison is used at S013 and S014. It should be noted that, when employing the expression "Deny list comparison?," Y (Yes) and N (No) are reversed from the case of "Allow list comparison?."

An example of the processing for abnormality may be discarding the packet or intentionally changing the CRC to an abnormal value (e.g., inverting the original CRC value).

Next, it is determined whether it is the end of the packet (S017). If it is the end of the packet (Y at S017), it is determined whether the process is terminated(S018). S018 is the same with S005 in FIG. 4. If it is not the end of the packet (N at S017), the process returns to S011.

If the condition at S011 is not satisfied (N at S011), the process proceeds to S017.

(Operation Procedure: Signature)

Figure 6:
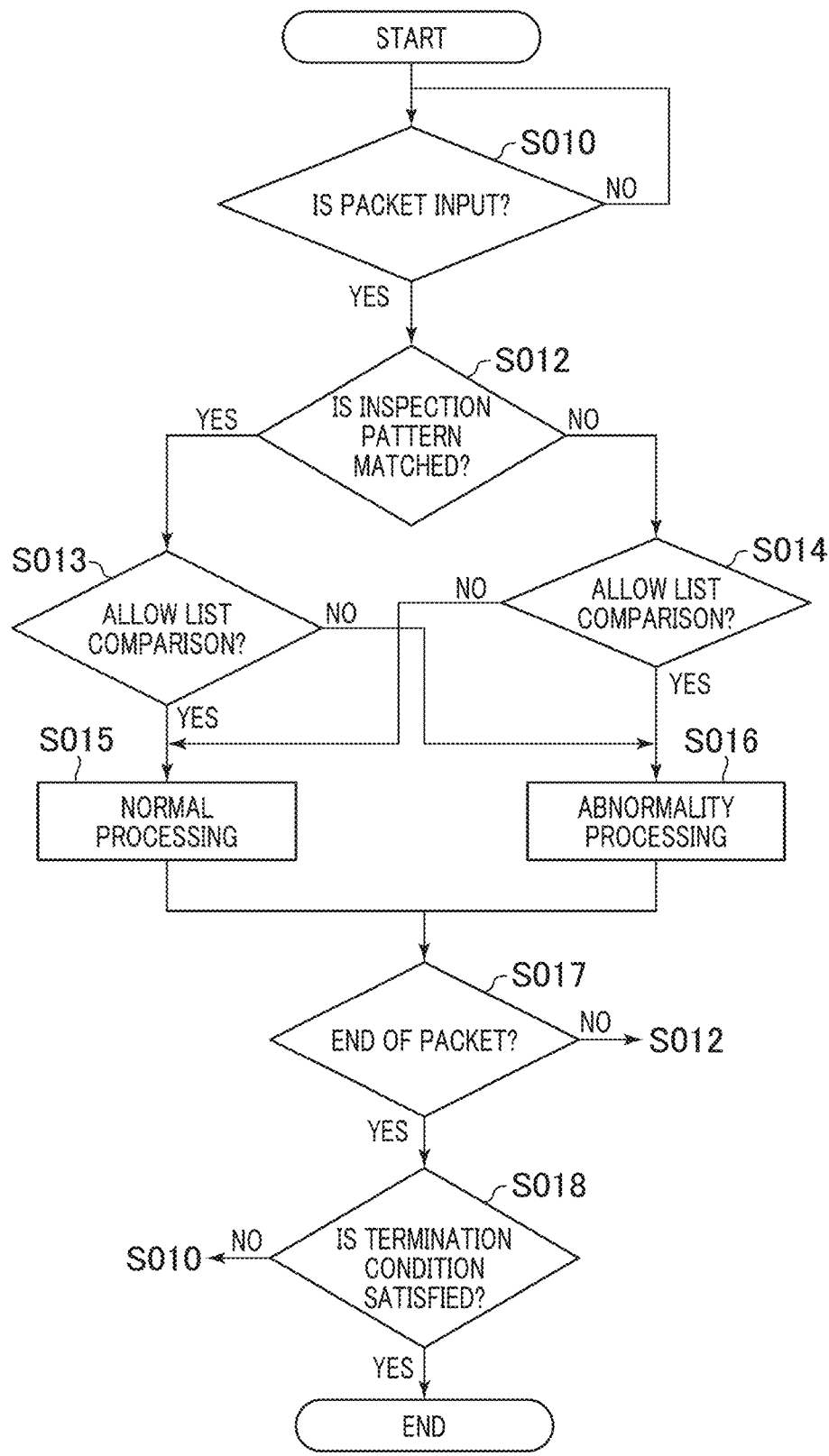
FIG. 6 shows an operation procedure of an embodiment of the present invention.

FIG. 6 shows a procedure for comparison with a predetermined signature and the like. The signature may appear at any location on a packet. Accordingly, the procedure is substantially similar to that in FIG. 5 except that the procedure at S011 is omitted.

Figure 7:
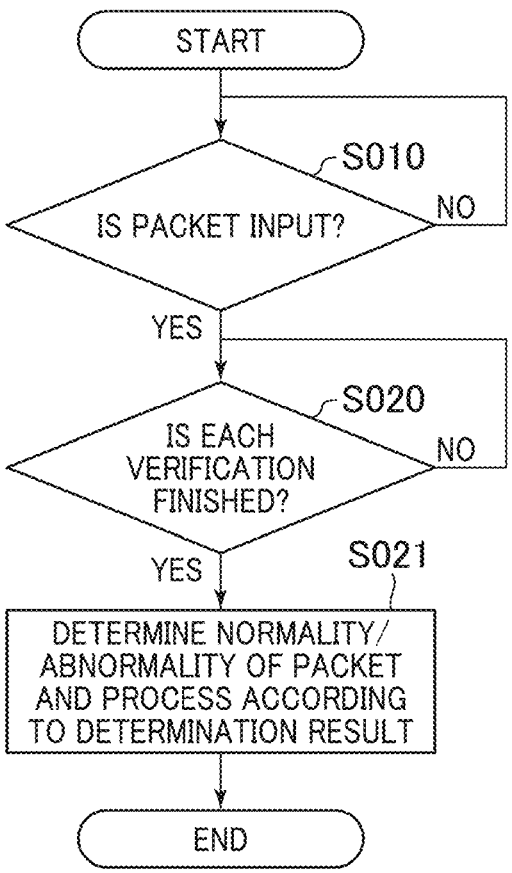
FIG. 7 shows an operation procedure of an embodiment of the present invention.

The comparison procedures for the inspection pattern shown in FIGS. 5 and 6 may be performed in parallel depending on the difference of the inspection patterns, whether the comparison is allow list determination or deny list determination, and the like. An operation integrating these factors is shown in FIG. 7.

First, the process waits for an input of a received packet (S010). When a received packet is input, the process waits for termination of the inspection of all the inspection patterns (S020). Typically, this is determined by the determination process by the fact that the real-time pattern inspection unit 134 reaches the end of the received packet. Alternatively, the termination may be determined when verification of each inspection pattern is determined to be terminated (for example, the inspection pattern is matched and some determination result is output) and all determination results are complete.

Once the verification of each inspection pattern is terminated (Y at S020), the overall determination result is made on the basis of individual determination result (S021). This may be determined by setting priority to the individual inspection pattern or on the basis of a determination method for all the inspection patterns (e.g., determined to be abnormal if any one is determined to be abnormal).

Although the normal processing and the abnormality processing are performed at S015 and S016 in FIGS. 5 and 6, only the determination result may be made at S015 and S016 and the conclusive processing may be performed at S021.

Moreover, the field on the protocol may be verified even when the signature is verified. For example, a header of a predetermined protocol may be identified, then the header may be excluded from the matching target of the inspection pattern, and matching may be limited to the data area.

(Intended Use)

Examples of the intended use of each time slot include collection of learning data for application of an AI and transfer of input information for executing inference by a neural network. Alternative examples may be communication for monitoring data and status data for applying preventive maintenance and predictive diagnosis for the controlled device 124.

An alternative example of the intended use may be for transferring the data in a case of updating and/or delivering the following objects from the central control apparatus 120 to the distributed control apparatus 123. The examples may be a program and firmware, an OS, a container (including a virtual machine) image that is a virtualization environment of an OS level or configuration information of a container, a security patch, and the like.

(Setting of Intended Use, Protocol, or Application to Inspection Pattern)

An intended use or a protocol associated with each inspection pattern may be set in selecting the inspection pattern by the inspection pattern storage unit 136 on the basis of the characteristic identified by the time slot characteristic storage unit 130.

For example, a communication protocol, an intended use, or an application program targeted by an inspection pattern may be set for the inspection pattern. For this setting any one or more of the communication protocols, the intended uses, and the application programs may be set. For example, a communication protocol may not be assumed and a specific application program may be assumed for the signature inspection pattern, and therefore the application program may be set. It should be noted that the intended use and the application program are listed as independent items because they may not correspond one-to-one. For example, there may be a case in which a plurality of different application programs are associated with the intended use of maintenance or used separately for each purpose.

Similarly, different communication protocols may be associated with the same intended use. For example, EtherCAT (IEC61158, IEC61784-2), COE (CANopen over EtherCAT) that is a higher profile of EtherCAT, or an IEC61850 GOOSE communication may be used for the intended use of control. In such a case, the control use is extracted as the characteristic of the time slot. Next, as the communication protocol associated with the intended use of control, for example, the inspection pattern for the COE and the inspection pattern for the IEC61850 GOOSE communication are selected and set in the real-time pattern inspection unit 134.

Figure 8:
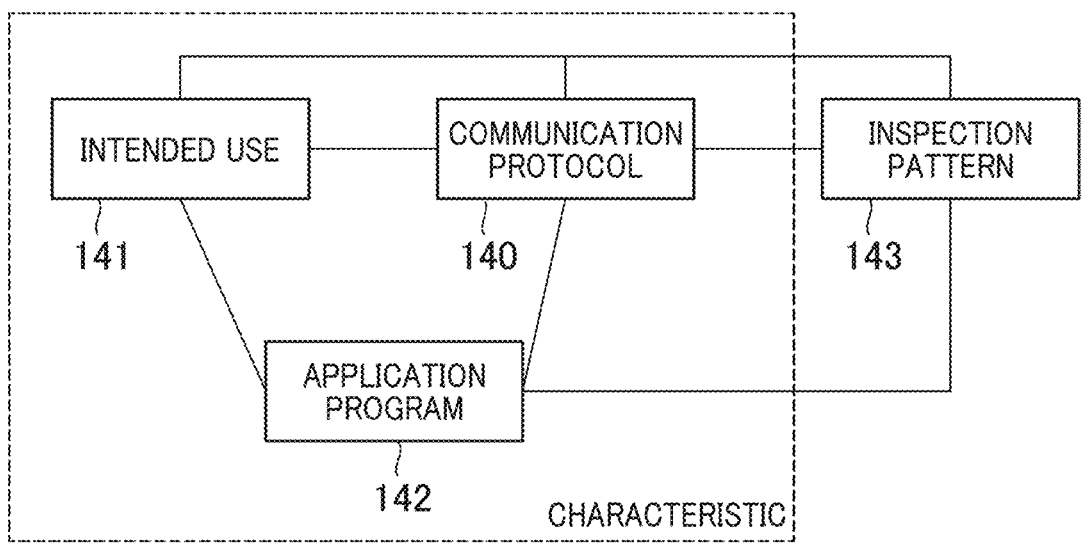
FIG. 8 shows a relation between characteristics and an inspection pattern according to an embodiment of the present invention.

The relation is shown in FIG. 8. The characteristics that may be selected from the time slot characteristic storage unit 130 include a communication protocol 140, an intended use 141, and an application program 142, which are associated with one another. However, to avoid a circular reference, the reference may not be circulated. For example, the characteristic extracted first is extracted as the intended use 141, and then the communication protocol 140 and/or the application program 142 associated with the intended use are/is extracted. Furthermore, after respectively extracting the related communication protocol 140 and the application program 142, the extraction of the relation is stopped. The respectively related inspection pattern is then selected.

Figure 9A:
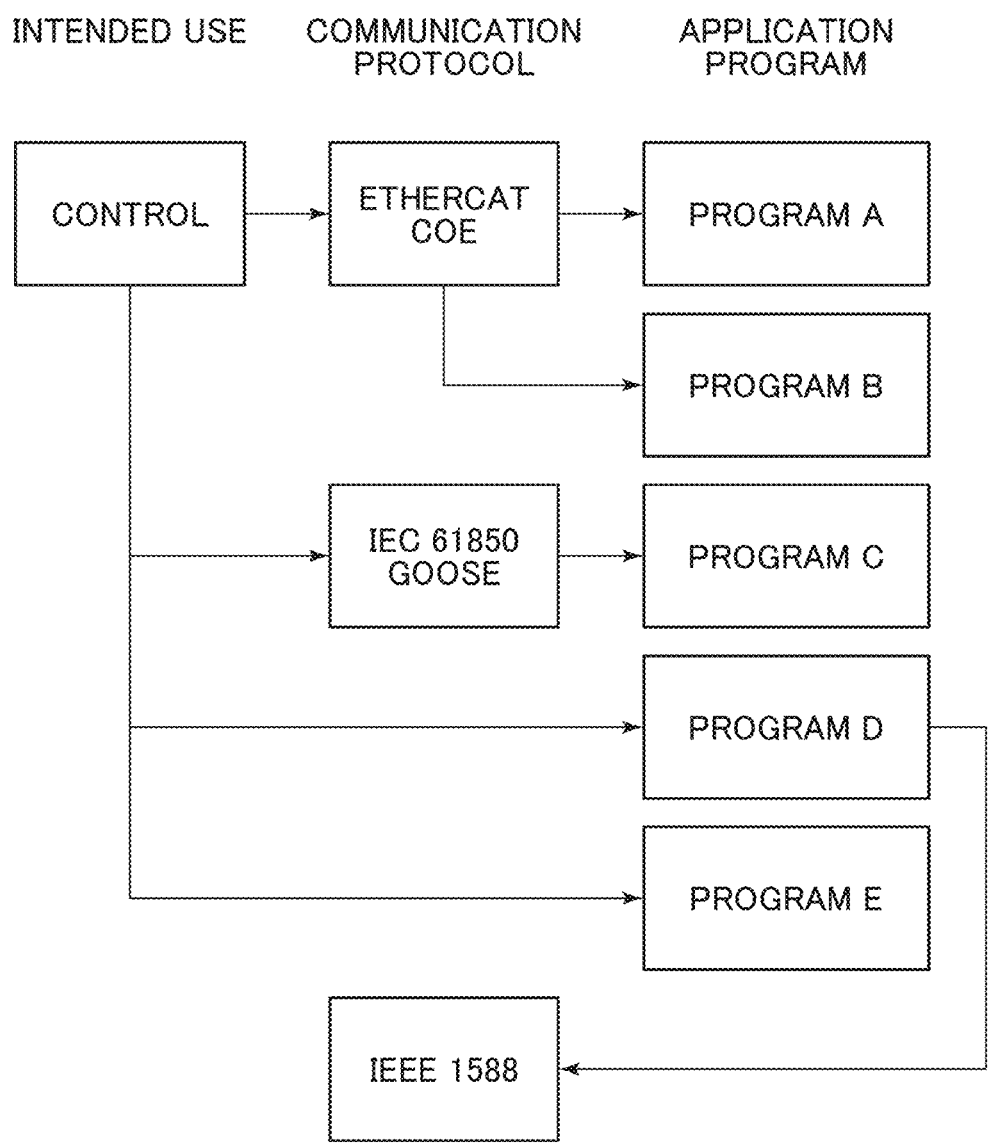
FIG. 9A shows a relation between the characteristics and the inspection pattern according to an embodiment of the present invention.

A specific example is shown in FIG. 9. FIG. 9A shows a relation between the characteristics. Herein, there is an intended use of control as the characteristic extracted by the time slot characteristic storage unit 130 firstly, then the communication protocol EtherCAT COE, the IEC61850 GOOSE, and the application programs D, E are extracted in turn. Next, A, B, and C are extracted as the application programs associated with the communication protocol EtherCAT COE and the IEC61850 GOOSE. Moreover, IEEE 1588 is selected as the communication protocol associated with the application program D.

Figures 9B, 10:
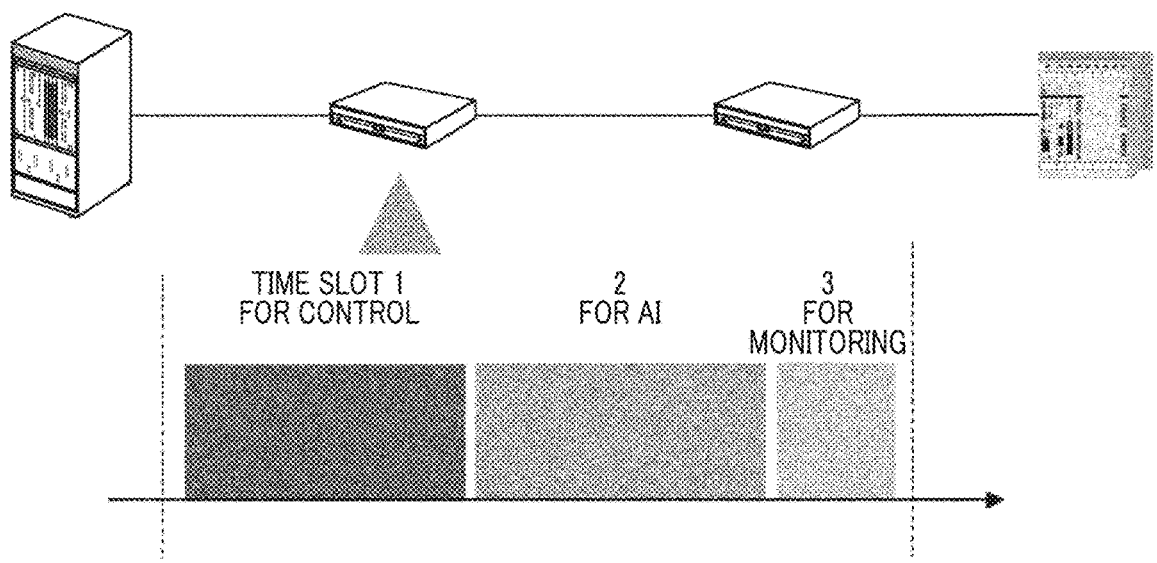
FIG. 9B shows a relation between the characteristics according to an embodiment of the present invention.
FIG. 10 shows a time slot in a relay communication device 121.

FIG. 9B shows a relation between each inspection pattern and the characteristic. For example, an inspection pattern 1 is directed to the EtherCAT COE as the communication protocol and the program B as the application program, and an inspection pattern 2 is directed to control as the intended use.

An inspection pattern is selected that is directed to each characteristic extracted. Taking an example of the characteristic shown in FIG. 9A, control is extracted as the intended use, the EtherCAT COE, the IEC61850 GOOSE, and IEEE 1588 as the communication protocol, and the programs A, B, C, D, and E as the application program. Therefore, 1 to 7 are selected as the inspection patterns.

Although the characteristics are ordered and the intended use is extracted first in FIG. 9, either the communication protocol or the application program may be extracted first. For example, if the characteristics may be in the order of the intended use, the communication protocol, and the application program, and the characteristic extracted by the time slot characteristic storage unit 130 is the communication protocol, only the communication protocol and the application program are extracted. Alternatively, if the characteristic extracted by the time slot characteristic storage unit 130 is the application program, only the application program is extracted.

(Non-Selection)

It should be noted that the specification of the inspection pattern in FIG. 9 may indicate not the associated characteristic but an unassociated characteristic. For example, the condition may be "applicable to protocols other than IEEE 1588". This can improve flexibility of the setting.

Similarly, the packet of the unassociated communication protocol may be discarded (unselected) in the time slot.

(Priority of Inspection Pattern)

It should be noted that there may be a case in which not all of the inspection patterns selected by the inspection pattern selection unit 131 can be applied to the computer resource of the real-time pattern inspection unit 134.

For example, there may be limitation to a logic capacity of an LSI (including an FPGA and a CPLD), limitation to a storage capacity of a RAM and the like, and limitation to time such as shorter time for the time slot with respect to matching process time for the selected inspection pattern.

In such a case, the inspection patterns may be prioritized and selected in the order of the priority. The prioritization may be based on fixed priority statically determined by the operator before starting operation of the system on the basis of trend information and statistic information of security attacks, or may be changed and set during operation. Alternatively, the prioritization may be dynamically determined in accordance with use frequency of the inspection pattern in the past, elapsed time since registration (e.g., an inspection pattern registered newly is inspected preferentially as the latest security threat), or elapsed time since the last use. Alternatively, the priority may be determined based on the characteristic extracted by the time slot characteristic storage unit 130 and the order of the extraction. For example, the priority may be changed in the following cases:

In a case in which the inspection pattern is associated with the intended use;

In a case in which the characteristic extracted by the time slot characteristic storage unit 130 first is the intended use;

In a case in which the order the time slot characteristic storage unit 130 extract the intended use is the second (e.g., the intended use is extracted after the communication protocol) or the third (e.g., the intended use is extracted after the communication protocol and the application program).

Alternatively, the priority may be determined by the result of weighting and summing these indices as the conclusive index.

In addition, the inspection patterns may be presented to the outside if there are many. This may be done by providing a register on the communication control IC 102 and making the register accessible from the software on the CPU 101. Alternatively, the inspection patterns may be notified to a preset destination by electronic means such as an electronic mail, or may be accessed from the outside using a web browser or the like via a web server built on the firewall 126. Otherwise, it may be presented on the firewall 126 by physical means such as an LED and an alarm. Notifying to the outside in this manner allows the operator to adjust the number of inspection patterns and deploy an additional firewall 126, which consequently facilitates proper operation of the control system in terms of security.

(Method of Switching Inspection Patterns)

A method of setting the inspection pattern includes configuring a matching function that includes the inspection pattern in advance as software and/or a hardware logic in an LSI (including an FPGA and a CPLD), and enabling or disabling the matching function.

Alternatively, the inspection pattern to be checked may be selected by changing a transfer path for a received packet to be checked in the real-time pattern inspection unit 134.

Alternatively, in a configuration of storing the inspection pattern in a storage device such as a RAM and loading the inspection pattern to the matching function in accordance with switching of the time slot, a storage address (source address to load) for each storage device may be changed in accordance with the selected inspection pattern.

In a case in which there are many time slots in a cycle (i.e., the inspection pattern is frequently switched) and storage devices having different access speed are configured in multiple stages, loading of the inspection patterns from the storage devices may be scheduled. For example, in the configuration shown in FIG. 2, the communication control IC 102 is configured with an FPGA, and the matching function for the inspection patterns is implemented in a hardware circuit, thereby configuring the storage device with two stages of the on-chip RAM in the communication control IC 102 and the memory 104.

In general, there is a tradeoff between the storage capacity and the access speed. In the above-described case, the on-chip RAM is accessible at a high speed from the hardware matching circuit in the FPGA, while its capacity is limited. On the other hand, the memory 104 can provide a relatively increased capacity, but its access speed is lower because the bus 106 is interposed.

FIG. 12A shows an example scheduling of transfer and load of the inspection patterns. It is assumed that time slots A to F are planned, the matching circuit has a capacity of the inspection pattern for a single time slot, the on-chip RAM has a capacity for three time slots, and a memory is capable of storing six time slots.

At t0, an inspection pattern A is transferred to the matching circuit, and respective inspection patterns are similarly transferred at t2, t4, t7, t10, t12, and t15. The matching circuit has the inspection pattern for the time slot at t1, t3, t5, t9, t11, t13, and t17, and checks the received packets.

At t6, the inspection patterns for the time slots D, E, and F are transferred from the memory to the on-chip RAM, and the inspection patterns for the time slots A, B, and C are transferred at t14. For example, t1-t0 represents access time (load time) for the on-chip RAM, and t8-t6 represents access time (load time) between the memory and the on-chip RAM.

On the basis of the access speed between respective devices, the transfer capacity, the access time, and start time of the time slot (t1, t3, t5, t9, t11, t13, t17), transfer start time (t0, t2, t4, t7, t10, t12, t15, t6, t14) is determined. The transfer start time can be designed in accordance with the number of inspection patterns, the size of the inspection pattern, and the storage capacity of the on-chip RAM and the matching circuit.

Although FIG. 12A shows two stages of the storage, there may be three or more stages, for example, the nonvolatile storage medium 105 (HDD or the like) may be added.

Although the configuration for loading the inspection patterns in the apparatus has been described above, the inspection patterns may be loaded from the storage device (e.g., NAS: Network Attached Storage) on the control network 122.

Figure 12B:
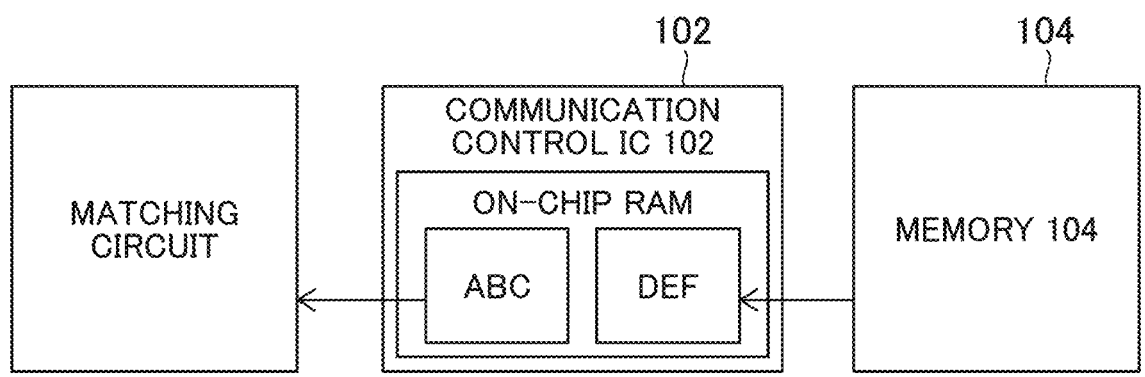
FIG. 12B shows an operational configuration that performs a matching process and an update of the inspection pattern according to an embodiment of the present invention.
Figure 13:
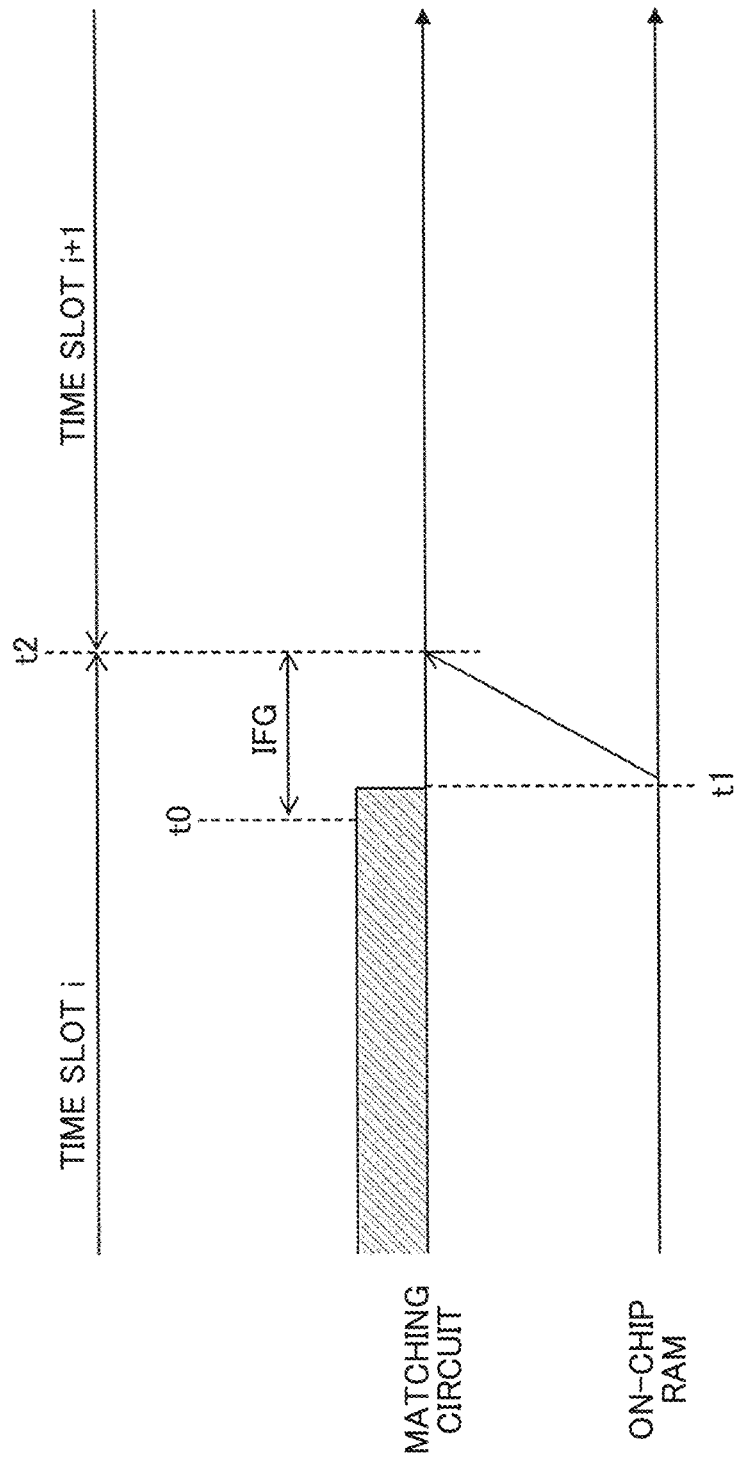
FIG. 13 shows the time slot and an operation according to an embodiment of the present invention.

It is also possible to update the inspection pattern using a portion of the on-chip RAM as an area for an update in parallel with the matching process. FIG. 12B shows an example of the functional configuration for this purpose. In this case, the on-chip RAM in the communication control IC 102 uses a dual port memory to enable a simultaneous access. As shown in FIG. 13, because it is expected that the packet may not be received until t2 if the processing time t1 at the end of the packet received immediately before the time slot is later than t0, the inspection pattern may be switched. Herein, t0 is a time point earlier than t2 by an interframe gap.
(Check by Software)

As long as a requirement for transfer delay is not strict, the received packet may be checked against an inspection pattern not by the cut-through transfer but by the store and forward technique that buffers the received packet. In such a case, after taking in the packet at the communication control IC 102 in the configuration shown in FIG. 2, the packet may be transferred to the memory 104 and checked by the software operated on the CPU 101.

Figure 11:
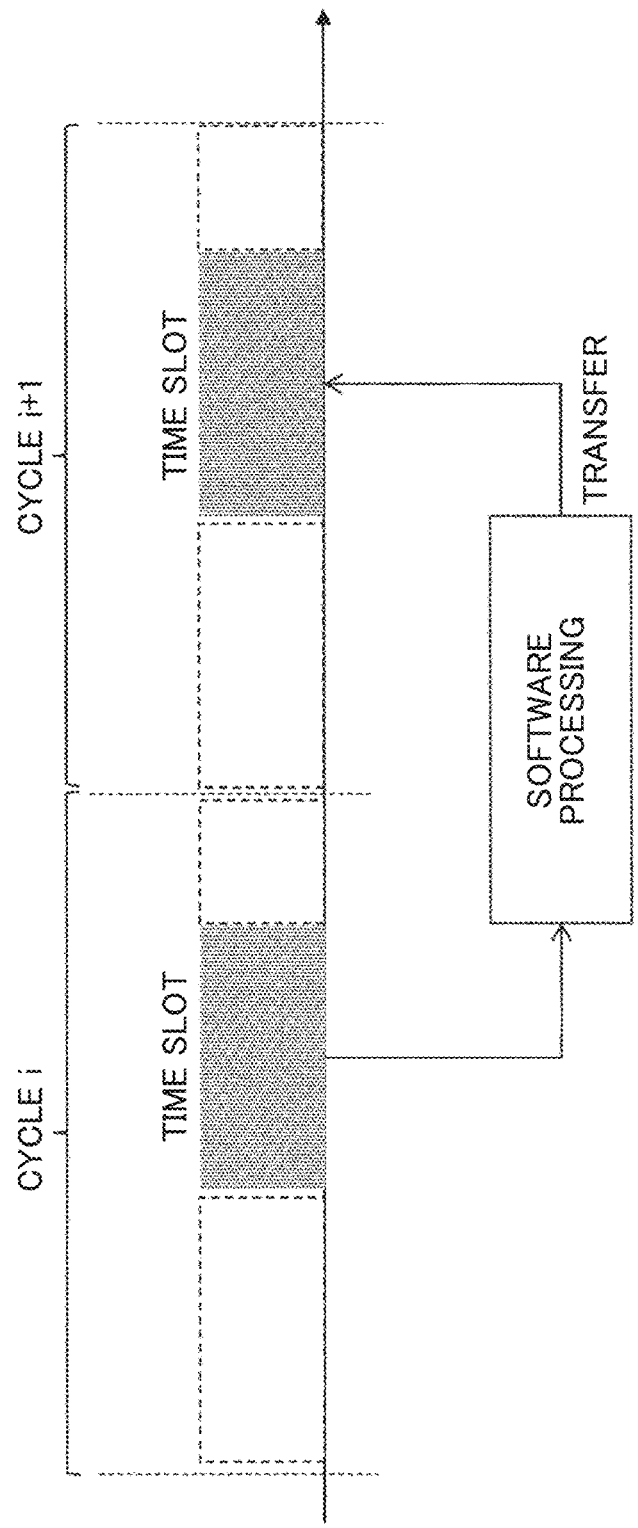
FIG. 11 shows the time slot and an operation according to an embodiment of the present invention.

Alternatively, there may be a processor-incorporated FPGA with a configuration similar to that in FIG. 2. In this case, the packet may not be transferred in the current time slot but may be transferred in the next or later cycle (FIG. 11).

In this manner, it is possible to improve the security level by checking the packets against a large number of inspection patterns stored in the memory 104 having relatively large storage capacity. An example of a case of applying such a process may be a case of targeting a predetermined time slot. Another example may be targeting a packet related to a predetermined intended use, communication protocol, or application program independent of the time slot.

It should be noted that an anti-virus software for a communication protocol in accordance with the specification may be used as the inspection pattern.

In a case in which the intended use mentioned above is used as the characteristic of the communication protocol, the relation between the intended use and the inspection pattern may be determined like following. The former represents the intended use, and the latter represents the feature of the inspection pattern, respectively.

Intended use of control: High-speed inspection is possible.
Intended use of AI (learning): Low speed but detailed inspection is possible.
Intended use of monitoring and intended use of information collection: Between the above (medium speed and moderate inspection content).

(Packet Received Immediately Before Switching of the Time Slot)

FIG. 10 shows an example in which each intended use described above is applied to time slots of the relay communication device 121. In FIG. 10, a time slot 1 is for control (intended use of control), a time slot 2 is for AI (intended use of AI (learning)), and a time slot 3 is for monitoring (intended use of monitoring and intended use of information collection).

Figure 14:
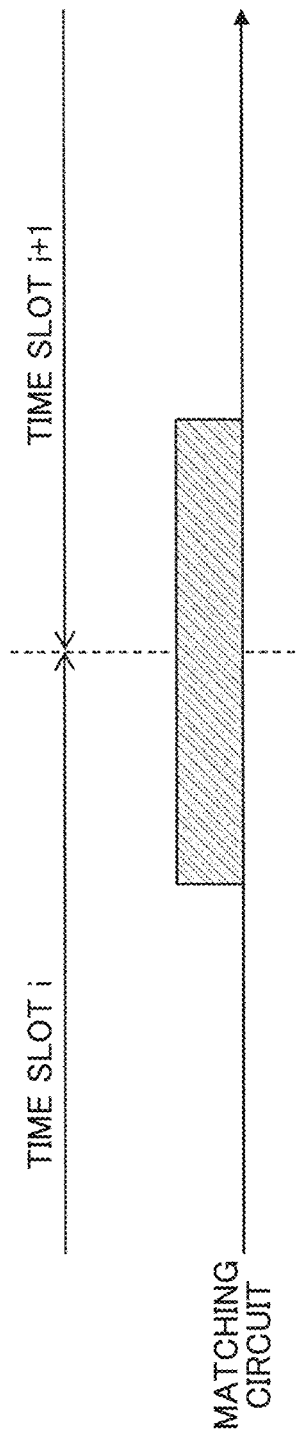
FIG. 14 shows the time slot and an operation according to an embodiment of the present invention.

A case in which the switching of the time slot overlaps the processing of a received packet is described (FIG. 14).

In this case, the packet may be checked against the inspection pattern as it is in the time slot A, or the packet may be discarded upon detection of overlap of the timing. Detection of the overlap of the timing may be presented to the outside. This may be done by providing a register on the communication control IC 102 and making the register accessible from the software on the CPU 101. Alternatively, the detection may be notified to a preset destination by electronic means such as an electronic mail, or may be accessed from the outside using a web browser or the like via a web server built on the firewall 126. Otherwise, it may be presented on the firewall 126 by physical means such as an LED and an alarm. Notifying to the outside in this manner allows the operator to adjust the transmission timing on the transmitting side and thus to facilitate ensuring a temporal restriction to communication time, which consequently facilitates proper operation of the control system.
(Cycle)

It should be noted that the inspection patterns for each time slot may be changed with respect to each cycle constituted by a set of a plurality of time slots.
(Multipart)

Moreover, although the firewall 126 is described to have one communication port for each of the transmitter 132 and the receiver 133, it may be provided with a plurality of communication ports as with the network relay 121. In this case, the inspection patterns may be changed in accordance with the time slot with respect to each port.
(Time Slot for Distribution of Inspection Patterns)

Some of the time slots may be used for distribution of the inspection pattern by the inspection pattern management apparatus 125. For example, the inspection pattern is not checked in this time slot.

The time slot may be set by the firewall 126 explicitly by means of either one or both of electronic and physical means, or a predetermined field on the packet may clearly express that the packet is for distribution of the inspection pattern. This illustrates that the firewall 126 recognizes the distribution of the inspection pattern and takes in the inspection pattern.

The inspection pattern may be discarded as it is or may be transferred. In a case in which a following apparatus is not the firewall 126, the inspection pattern is always discarded. Therefore, it may be set in advance or checked through communication whether the following apparatus is the firewall 126.

The inspection pattern may be distributed by taking appropriate security means such as encryption, certificate, and the like. The inspection pattern may be transmitted dividedly in a plurality of cycles. After update, an unauthorized packet that matches the inspection pattern may be intentionally transmitted for operation verification, or there may be provided a time slot for such operation verification.
(Ambiguous Searching)

A portion of the inspection pattern may be defined by a plurality of values or may not be defined ("don't care" that does not require perfect matching). In this manner, it is possible to perform ambiguous searching, and to detect a subspecific virus, or a signature. Alternatively, it is possible to increase efficiency of the storage capacity for the inspection patterns because a single inspection pattern information can express a plurality of patterns.
(Estimate Characteristic from Previous and Subsequent Time Slots)

It should be noted that the characteristic of a time slot may be automatically extracted from the characteristics of the previous and subsequent time slots. For example, in the last time slot in a cycle, if the time synchronization protocol has not been executed in previous time slots, the time slot is estimated to be used for the time synchronization protocol.

In this manner, knowing a set of all the characteristics, a characteristic not extracted from executed time slots may be estimated.

Alternatively, the characteristic may be determined from the communication content of a resource reservation protocol.
(Time Slot Firewall)

It should be noted that the firewall 126 does not have to inspect all of the time slots planned on the control network 122, but may check the inspection pattern in one or more predetermined time slots.

There may be sequentially arranged a plurality of such firewalls 126 that target limited time slots. The security target can be set flexibly by limiting the target time slot with respect to each equipment of the firewalls 126 and adjusting arrangement on the control network 122.
(Hierarchization)

FIG. 16 shows an example of hierarchically checking the inspection patterns using a plurality of firewalls 126. FIG. 16 shows a part of a network configuration.

A firewall 126a checks the inspection pattern in each of time slots B, and C. Firewalls 126b, c, and d check packets transferred from the firewall 126a against the inspection pattern in time slots further subdivided from the planned time slot, respectively. For example, packets are set to be transferred as described below. The packets received by the firewall 126a in the time slot A is transferred to the firewall 126b. The packets received in the time slot B is transferred to the firewall 126c. The packets received in the time slot C is transferred to the firewall 126d.

In such a configuration, for example, as described below, subprotocols in a certain communication protocol may be shared. In the time slot A, IEC61850 is checked as the communication protocol. Moreover, the IEC61850 GOOSE is checked in a time slot D of the firewall 126b, SampledValue is checked in a time slot E, and others are checked in a time slot F.

Alternatively, the firewall 126a may check the inspection patterns with the communication protocol, the firewall 126b may hierarchize the intended use with respect to each characteristic by checking the intended use of control in the time slot D, the intended use of monitoring in a time slot E, and the intended use of AI learning in a time slot F with respect to each intended use.

Afterwards, a firewall 126e may put the packets together on the communication path, or may transfer the packets to respective destinations (e.g., the firewall 126d).

It should be noted that the method of routing with respect to each time slot may be statically configured or may be configured with the VLAN.

In this manner, it is possible to make the configuration for checking the inspection patterns flexible, and it is also possible to ensure the security level by distributing the functions to a plurality of firewalls 126.
(Dynamic Determination)

There is another example in which, in a state where only the time slots are planned but no inspection pattern in each time slot is not specified, the inspection pattern is determined from the contents communicated in each time slot. For example, the inspection pattern to be applied is determined from the information in FIG. 9 and the protocol type of the packet communicated in the target time slot Specifically, in a case in which the IEC61850 GOOSE is communicated in a certain time slot, the inspection pattern for the IEC61850 GOOSE, the inspection pattern for the intended use of control, and the inspection patterns for related application programs may be applied.

This may be done by dividing the communication into a setup phase and an actual operation phase and applying association between the inspection pattern and the time slot determined during the setup phase to the actual operation phase or later. The setup phase may be distinguished from the actual operation phase by the time (predetermined time point, elapsed time since the start of operation) and an explicit indication of notification indicative of switching of the phase. This may include software operation or hardware operation (setup via a button or a physical switch) on the firewall 126.

(Utilization of SDN)

It should be noted that the inspection pattern may be changed by the inspection pattern management apparatus 125 dynamically accessing the firewall 126. This may be done by changing the inspection pattern held on the memory 104, the communication control IC 102, or the nonvolatile storage medium 105 of the firewall 126.

At this time, the contents of the inspection pattern notified from the inspection pattern management apparatus 125 to the firewall 126 may include the following in addition to the content of the inspection pattern itself: inclusion of information and/or an identifier of the predetermined time slot associated with the inspection pattern; and inclusion of a characteristic (a communication protocol, an intended use, an application program, and the like) associated with the time slot.

Alternatively, the inspection pattern itself may not be included and the characteristic associated with respect to each time slot may be changed to be notified. Notification of change of the characteristic can automatically change the inspection pattern applied by the firewall 126. Because this can reduce an amount of communication data in a simpler manner compared with a method of notifying the inspection pattern itself, it is possible to change the setting while suppressing consumption of network resources (such as communication band) of the control network 122.

At this time, it is possible to record history of changing the inspection pattern and the characteristic so that the current status can be checked and what kind of the inspection pattern was applied in an arbitrary time point in the past.
(Synchronization Abnormality)

Operations are described in a case in which the firewall 126 cannot be synchronized and fails to appropriately manage the time slot. Such cases may be as follows.

No response or distribution of time information based on a time synchronization protocol from another device.

Elapsed time since the last time synchronization exceeds a predetermined time.

Occurrence of an abnormality in a time management device (a software clock on the CPU 101, a quartz oscillator, an oscillator, a clock device in the communication control IC 102) or the like in the firewall 126.

The following measures can be taken when the time slot cannot be appropriately managed.

Transfer each of the received packets.

Discard each of the received packets.

Check the packets against a group of inspection patterns defined for abnormality of time synchronization.

Check the packets against inspection patterns selected on the basis of priority of the inspection patterns.

Transfer only packets related to communication of the time synchronization protocol.

In order to determine a time synchronization abnormality on the basis of the elapsed time since the last time synchronization, the firewall 126 may be provided with a means that presents information such as a threshold of elapsed time and the current elapsed time to the outside. This may be done by providing a register on the communication control IC 102 and making the register accessible from the software on the CPU 101 or an external device through communication.

It may also be presented to the outside that there is a time synchronization abnormality. This may be done by providing a register on the communication control IC 102 and making the register accessible from the software on the CPU 101. Alternatively, the abnormality may be notified to a preset destination by electronic means such as an electronic mail, or may be accessed from the outside using a web browser or the like via a web server built on the firewall 126. Otherwise, it may be presented on the firewall 126 by physical means such as an LED and an alarm. Such notification to the outside enables the operator to know the time synchronization abnormality and conduct a necessary inspection and appropriate measure, which consequently facilitates proper operation of the control system.

According to the present embodiment, because the inspection pattern can be changed with respect to each time slot, behavior of the passing packet can change with respect to each time slot even if the packet is the same. For example, even if the abnormality is processed by CRC modification in a particular time slot, the CRC modification may not be performed in another time slot.

(Wireless Application)

Although the present embodiment has been described in relation to a time slot type of a wired communication scheme such as TSN, wireless communication such as 5G, 4G, Wifi, LPWA (Low Power, Wide Area), LoRa, and SIGFOX are also applicable.

(System Configuration)

Figure 17:
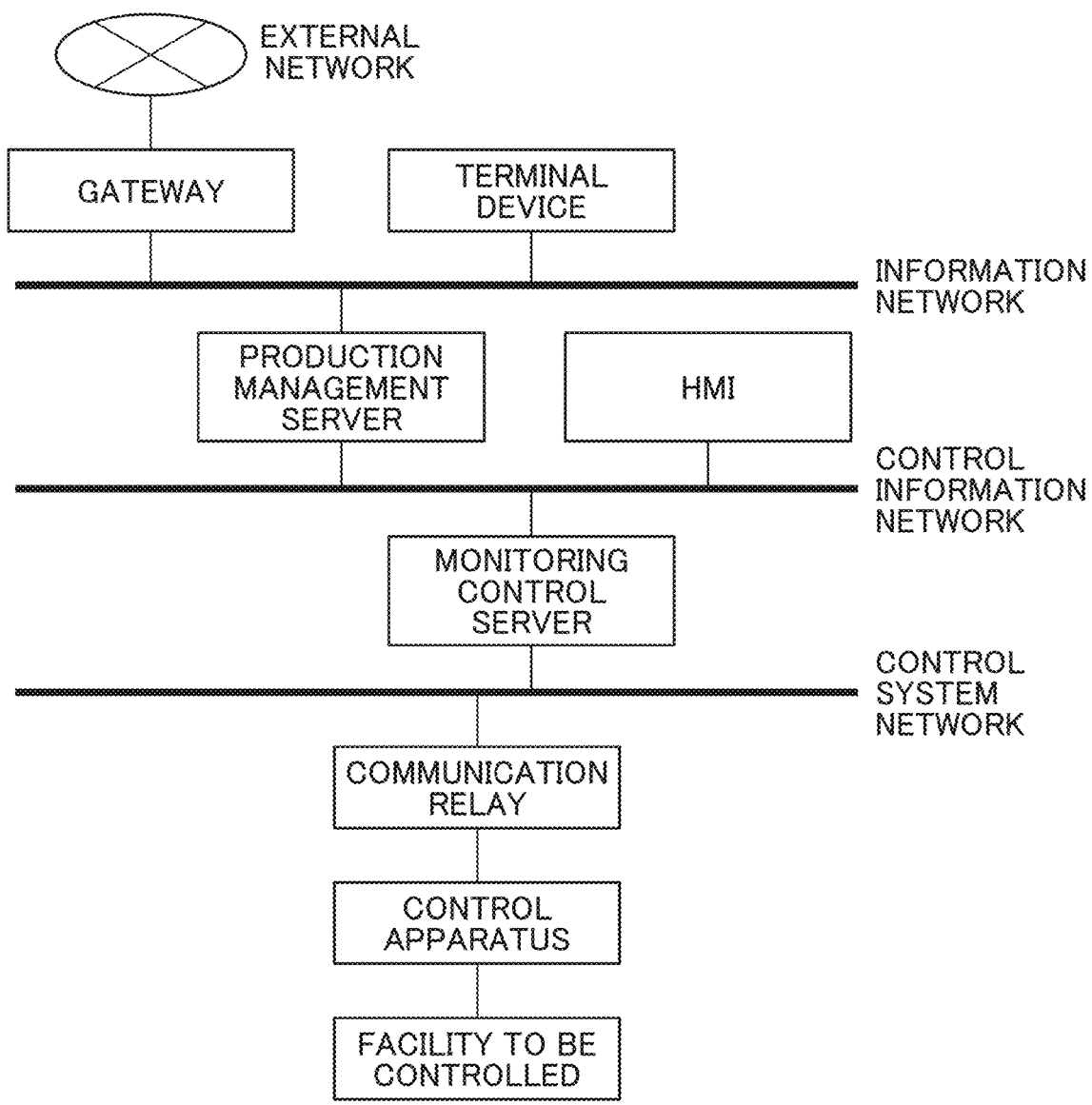
FIG. 17 is a system configuration diagram using an embodiment of the present invention.

Examples of a system configuration include a hierarchical structure shown in FIG. 17, a flat system as shown in FIG. 1, and a configuration without a physical connection like 5G and wireless communication.

(Multiplexing Element)

Although the present invention presented that the inspection pattern is changed in accordance with the time slot, the invention is not limited to time division, but the inspection pattern may be changed in accordance with the multiplexing element. Examples of such a multiplexing element include an inspection pattern with respect to each amplitude in a case of transmitting a signal with respect to each basic signal (e.g., carrier signal) with a different amplitude, an inspection patter with respect to each frequency in a basic signal with a different frequency, and an inspection pattern with respect to each phase in a basic signal with a different phase.

As a functional configuration of the real-time pattern inspection unit 134, a demultiplexer 150 shown in FIG. 15 separates a signal in accordance with the multiplexing element. A real-time pattern inspection unit 151 checks each separated signal with the inspection pattern. A multiplexer 152 multiplexes the separated signals. At this time, attack data and unauthorized abnormal signals may be discarded without being multiplexed (e.g., only the basic carrier waves are transmitted).

From the configuration described above, the present embodiment can improve the availability by avoiding such a process of discarding a packet that accidentally matches an inspection pattern directed to an irrelevant communication protocol or communication characteristic in a certain time slot. It is also possible to ensure security while efficiently utilizing limited computer resources (storage capacity, time assigned for processing of CPU and the like) by limiting the resources to checking of the inspection pattern in accordance with the time slot.

Especially, in a case in which the present embodiment is applied to a control system, it is possible to provide an advanced control system that is highly efficient while ensuring security and that enables introduction of information technology to the control system while ensuring a real-time requirement for the control system.

LIST OF REFERENCE SIGNS

101: CPU, 102: communication control IC, 103: PHY, 104: memory, 105: nonvolatile storage medium, 106: bus, 120: central control apparatus, 121: relay communication device, 122: control network, 123: distributed control apparatus, 124: controlled device, 125: inspection pattern management apparatus, 126: firewall, 130: time slot characteristic storage unit, 131: inspection pattern selection unit, 132: transmitter, 133: receiver, 134, 151: real-time pattern inspection unit, 135: time-slot cooperation time-synchronization unit, 136: inspection pattern storage unit, 140: communication protocol, 141: intended use, 142: application program, 143: inspection pattern, 150: demultiplexer, 152: multiplexer

The invention claimed is:

1. A communication control apparatus for transferring a communication frame, comprising one or more memory devices having a program stored therein that, when executed by one or more processors, causes the one or more processors to:

receive a communication frame;

identify a plurality of time slots for processing the communication frame;

identify characteristics of the plurality of time slots, wherein the characteristics of the plurality of time slots include at least a communication protocol and at least one of an intended use, and an application program that uses the communication frame;

identify an inspection pattern specific to each of the plurality of time slots to detect an unauthorized content, based at least in part on a priority level of the inspection pattern;

in response to a detection of the unauthorized content, determine a security measure to be taken against the communication frame, the security measure specific to each of the plurality of time slots and in accordance with an identified characteristic of each of the plurality of time slots; and take the security measure by:

comparing the received communication frame with the inspection pattern, and changing an error checking code of the communication frame based at least in part on a result of the comparing.

2. The communication control apparatus according to claim 1, wherein the one or more processors are configured to:

in response to an identification of one of the plurality of time slots, cause switching to the one of the plurality of time slots, and specify a security measure for the one of the plurality of time slots.

3. The communication control apparatus according to claim 1, wherein the one or more processors are configured to:

identify the plurality of time slots based at least in part on information included in the communication frame.

4. The communication control apparatus according to claim 1, wherein the one or more processors are configured to:

extract a characteristic of the communication frame from the communication frame, and specify the security measure in accordance with the extracted characteristic of the communication frame.

5. A communication system for transferring a communication frame, comprising one or more memory devices having a program stored therein that, when executed by one or more processors, causes the one or more processors to:

receive a communication frame;

a plurality of time slots for processing the communication frame;

identify characteristics of the plurality of time slots, wherein the characteristics of the plurality of time slots include at least a communication protocol and at least one of an intended use, and an application program that uses the communication frame;

identify an inspection pattern specific to each of the plurality of time slots to detect an unauthorized content, based at least in part on a priority level of the inspection pattern;

in response to a detection of the unauthorized content, determine a security measure to be taken against the communication frame, the security measure specific to each of the plurality of time slots and in accordance with an identified characteristic of each of the plurality of time slots; and take the specified security measure, by:
  comparing the received communication frame with the inspection pattern, and
  changing an error checking code of the communication frame based at least in part on a result of the comparing.

* * * * *